United States Patent
Hsu et al.

(10) Patent No.: US 12,482,488 B2
(45) Date of Patent: Nov. 25, 2025

(54) HEAT-SINK STRUCTURE IN MAGNETIC STACK, AND RELATED ARTICLES, SYSTEMS, AND METHODS

(71) Applicant: Seagate Technology LLC, Fremont, CA (US)

(72) Inventors: Wei-Heng Hsu, San Jose, CA (US); Pin-Wei Huang, Fremont, CA (US); YingGuo Peng, San Ramon, CA (US); Yassine Quessab, San Francisco, CA (US); Yue Hu, Milpitas, CA (US); Florin Zavaliche, San Ramon, CA (US); Ganping Ju, Pleasanton, CA (US); Daniel Staaks, Fremont, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/640,266

(22) Filed: Apr. 19, 2024

(65) Prior Publication Data
US 2025/0329345 A1    Oct. 23, 2025

(51) Int. Cl.
*G11B 5/31* (2006.01)

(52) U.S. Cl.
CPC .................. *G11B 5/3133* (2013.01)

(58) Field of Classification Search
None
See application file for complete search history.

(56) References Cited

U.S. PATENT DOCUMENTS

| | | | |
|---|---|---|---|
| 8,576,672 B1 | 11/2013 | Peng et al. | |
| 8,765,273 B1 * | 7/2014 | Kubota | G11B 5/737 |
| | | | 360/59 |
| 9,236,078 B2 * | 1/2016 | Hu | G11B 5/851 |
| 9,263,076 B1 * | 2/2016 | Peng | G11B 5/7369 |
| 9,754,618 B1 * | 9/2017 | Srinivasan | G11B 5/7375 |
| 9,824,710 B1 * | 11/2017 | Yuan | G11B 5/7375 |
| 10,127,939 B2 * | 11/2018 | Niwa | G11B 5/7369 |
| 10,236,026 B1 | 3/2019 | Zhang et al. | |
| 10,276,199 B1 | 4/2019 | Ho et al. | |
| 10,276,202 B1 * | 4/2019 | Jubert | G11B 5/7369 |
| 10,453,487 B2 | 10/2019 | Kubota et al. | |
| 11,437,064 B1 | 9/2022 | Jubert et al. | |

(Continued)

FOREIGN PATENT DOCUMENTS

| | | | | |
|---|---|---|---|---|
| JP | 2006196151 A * | 7/2006 | | B82Y 10/00 |
| WO | WO-2004038716 A1 * | 5/2004 | | G11B 11/10506 |
| WO | 2018046075 A1 | 3/2018 | | |

OTHER PUBLICATIONS

Slifka et al., "Thermal Conductivity of Magnesium Oxide From Absolute, Steady-State Measurements," Journal of Research of the National Institute of Standards and Technology, vol. 103, No. 4, pp. 357-363, Jul.-Aug. 1998, (7 pages).

*Primary Examiner* — William J Klimowicz
(74) *Attorney, Agent, or Firm* — Mueting Raasch Group (57) ABSTRACT

A magnetic stack includes a magnetic recording structure and at least two heat-sink layers where heat-sink layer located furthest from the magnetic recording structure has thermal conductivity equal to or greater than intervening heat-sink layers. One or more interlayers can be included in the magnetic stack. Data storage devices and systems including one or more of the magnetic stacks, and related methods.

18 Claims, 8 Drawing Sheets

(56) References Cited

U.S. PATENT DOCUMENTS

| | | | |
|---|---|---|---|
| 11,567,834 B2 | 1/2023 | Bent et al. | |
| 11,763,845 B2 | 9/2023 | Zavaliche et al. | |
| 11,869,556 B2 | 1/2024 | Jubert et al. | |
| 2006/0154110 A1* | 7/2006 | Hohlfeld | G11B 5/855 |
| 2013/0286804 A1* | 10/2013 | Zhao | G11B 5/6088 |
| | | | 369/13.33 |
| 2015/0093598 A1* | 4/2015 | Kubota | G11B 5/851 |
| | | | 204/192.15 |
| 2016/0358622 A1 | 12/2016 | Arora et al. | |
| 2018/0240487 A1* | 8/2018 | Niwa | G11B 5/7369 |
| 2022/0381738 A1* | 12/2022 | Zhang | G01N 1/44 |
| 2023/0178106 A1 | 6/2023 | Zavaliche et al. | |
| 2024/0331728 A1* | 10/2024 | Hsu | G11B 5/7375 |
| 2025/0078868 A1* | 3/2025 | Jubert | G11B 5/85 |

\* cited by examiner

HEAT-SINK STRUCTURE IN MAGNETIC STACK, AND RELATED ARTICLES, SYSTEMS, AND METHODS

BACKGROUND

Data storage devices such as hard-disk drives (HDDs) using heat-assisted magnetic recording (HAMR) technology typically utilize a laser to heat a small spot on a magnetic recording disk. Heating the magnetic recording disk reduces the coercivity of the magnetic media, which enables a write head to change the magnetization direction of a bit and thus store information to the magnetic media. In HAMR HDD, a magnetic recording head may include a light source such as a laser and a near-field transducer (NFT) to heat and lower the coercivity of magnetic grains in a spot of focus on a magnetic recording disk. Managing the thermal gradient in the magnetic recording disk and the power applied to the laser, which can impact recording performance, can be challenging.

SUMMARY

The present disclosure includes embodiments of a magnetic stack that includes a magnetic recording structure, a first heat-sink layer, and a second heat-sink layer. The second heat-sink layer is disposed between the magnetic recording structure and the first heat-sink layer. The second heat-sink layer has a thermal conductivity that is 50 W/(m*K) or less, and that is less than the thermal conductivity of the first heat-sink layer.

The present disclosure also includes embodiments of a method of manufacturing a magnetic stack. The method includes forming a second heat-sink layer over a first heat-sink layer. The second heat-sink layer has a thermal conductivity that is 50 W/(m*K) or less, and that is less than the thermal conductivity of the first heat-sink layer.

The present disclosure also includes embodiments of a magnetic stack that includes a magnetic recording structure, a first heat-sink layer, a second heat-sink layer, and at least two interlayers. The second heat-sink layer is disposed between the magnetic recording structure and the first heat-sink layer. The second heat-sink layer has a thermal conductivity that is less than the thermal conductivity of the first heat-sink layer. The two interlayers are disposed between the magnetic recording layer and the first heat-sink layer. Each of the two interlayers has a thermal conductivity that is less than the thermal conductivity of the second heat-sink layer.

BRIEF DESCRIPTION OF THE DRAWINGS

The discussion below makes reference to the following figures, wherein the same reference number may be used to identify the similar/same component in multiple figures. The schematic figures are for illustration purposes and are not necessarily drawn to scale.

DETAILED DESCRIPTION

The present disclosure relates to improved heat-sink configurations in a magnetic stack for use with data storage devices such as HDDs.

Figure 1A:
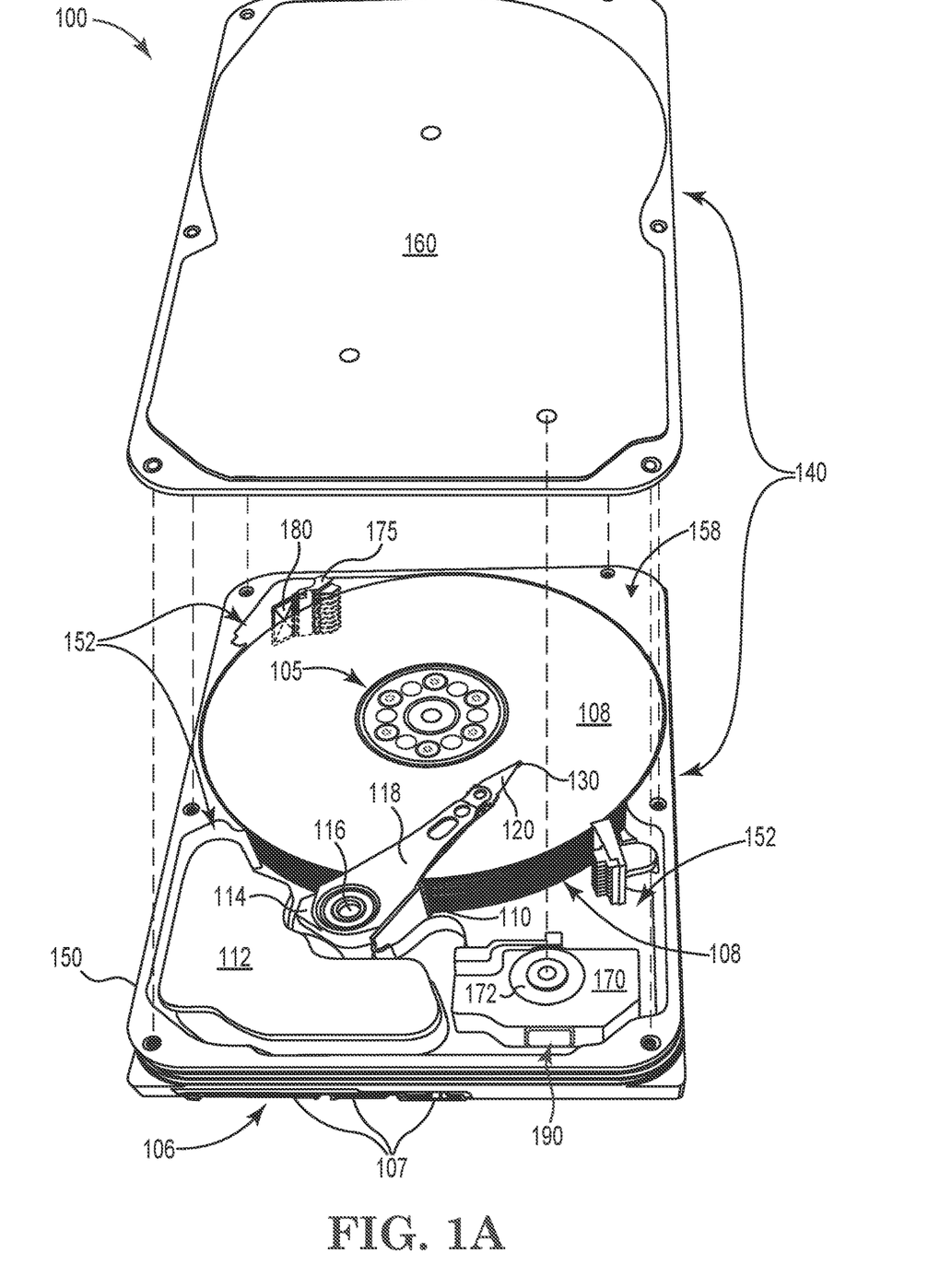
FIG. 1A is an exploded, perspective view of an example of a hard disk drive that may include a magnetic stack according to the present disclosure.

Before discussing the heat-sink layer configurations of a magnetic stack according to the present disclosure, an example of a data storage device 100 that may include one or more magnetic stacks will be described with respect to FIGS. 1A and 1B.

Data storage device 100 is illustrated as a HDD that includes an outer enclosure or housing 140 configured to contain multiple hard-disk drive components, including electronic components. Housing 140 includes a base 150 and a top cover 160. Base 150 includes a recess or cavity 152 configured to accommodate components of data storage device 100. Data storage device 100 further includes a printed circuit board assembly (PCBA) 106. PCBA 106 of this configuration is coupled to base 150 and includes a plurality of input/output connectors 107 that are each configured to provide an interface between one or more components of data storage device 100 and one or more host devices (e.g., a computer, a server, a consumer electronic device, or the like).

Base 150 and top cover 160 may be formed from any suitable material, such as metal (e.g., aluminum), plastic, or other suitable material or combinations thereof. In some embodiments, base 150 includes multiple components, such as an outer frame and a bottom cover, that are coupled together (e.g., by screws, welding, or the like).

Figure 1B:
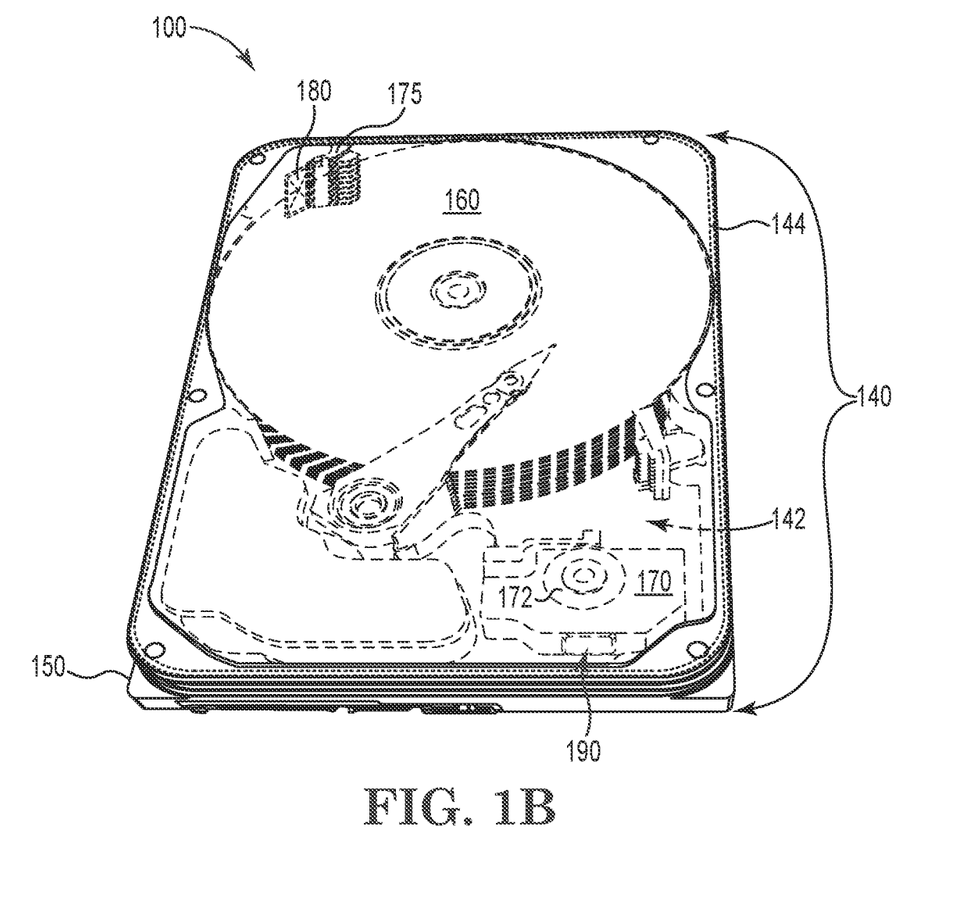
FIG. 1B is a perspective view of the hard disk drive shown in FIG. 1A in its assembled configuration and showing interior components in broken lines.

Top cover 160 is configured to couple to base 150 to enclose components of data storage device 100, as shown in FIG. 1B. As shown, top cover 160 is aligned with and coupled to a surface of base 150, such as a surface 158 shown in FIG. 1A, to define an interior volume 142 of data storage device 100, which includes an interior gas space. Components other than those illustrated or specifically identified in FIGS. 1A and 1B and described herein are contemplated as being positioned within the interior volume 142, such as a preamp, a load/unload ramp, and/or assembly hardware, for example. Top cover 160 can be coupled to base 150 using any suitable technique, such as using one or more screws, connection fingers, locking/clipping structures, adhesives, rivets, other mechanical fasteners, welding (e.g., ultrasonic welding) or combinations thereof.

In some embodiments, data storage device 100 can further include one or more seals 144 disposed between base 150 and top cover 160 and configured to seal the interior volume 142 of data storage device 100. In embodiments, seal 144 can be a weld formed between base 150 and top cover 160, or seal 144 can be a form-in-place gasket (FIPG). Examples of a FIPG include epoxy (e.g., a two-part epoxy) and acrylate, among others. The FIPG may be applied along an outer edge of top cover 160 and/or base 150 and thermally cured after coupling top cover 160 to base 150, for example. Other methods of sealing can additionally or alternatively be used to connect the base 150 to top cover 160.

A gas or gas mixture may be added to interior volume 142 of data storage device 100. Helium, for example, may be included in interior volume 142 to reduce mechanical vibrations, particularly of head gimbal assemblies (HGAs) of data storage device 100. Helium may also be included within data storage device 100 to enable lower head-media spacing (HMS) between a reader and/or writer of a magnetic recording head and a magnetic disk, and thus a higher areal density capability (ADC) of data storage device 100.

In some embodiments, data storage device 100 can be a hermetically sealed data storage device, which can be defined by, e.g., the amount of gas (e.g., helium) that leaks from the data storage device after it has been sealed (e.g., a welded HDD). In some embodiments, a hermetically sealed data storage device having its interior gas space filled with helium gas has a nominal helium leak rate of less than 10% by volume in five years. In some embodiments, in terms of (atm cc/second), a hermetically sealed data storage device having its interior gas space filled with helium gas has a nominal helium leak rate of $10 \times 10^{-8}$ atm (atmosphere) cc (cubic centimeter)/second or less at 25° C.; $8 \times 10^{-8}$ atm cc/second or less, $5 \times 10^{-8}$ atm cc/second or less; or even $4 \times 10^{-8}$ atm cc/second or less at 25° C.

Data storage device 100 includes a head stack assembly (HSA) 110 and one or more magnetic recording disks 108 configured to store bits of data.

HSA 110 further includes a plurality of HGAs 120. Each HGA 120 includes a magnetic recording head 130 with a read head and a write head for reading data from and writing data to a surface of a magnetic recording disk 108. Other components of a magnetic recording head 130 can be included, such as heaters, heat sinks, and piezoelectric actuators, for example.

Data storage device 100 further includes a motor assembly 105 configured to rotatably support magnetic recording disks 108 and circumferentially rotate magnetic recording disks 108 about an axis of rotation during operation. Magnetic recording disks 108 are mounted on motor assembly 105 such that an annular volume of each magnetic recording disk 108 encircles a portion of motor assembly 105. Motor assembly 105 may rotate magnetic recording disks 108 during an operation of data storage device 100 such that each magnetic recording disk 108 moves relative to a respective magnetic recording head 130 to enable the magnetic recording head 130 to read data from and/or write data to the magnetic recording disk 108.

Data storage device 100 also includes a voice coil drive actuator 112 that produces a magnetic field that exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus magnetic recording heads 130, to move relative to magnetic recording disks 108.

Data storage device 100 includes a diverter 175 that is proximal to magnetic disks 108. Diverter 175 is configured to divert helium and/or other interior gas mixtures(s) to reduce windage on rotatable drive actuator arms 118 which can reduce undesired vibrations that may cause a magnetic recording head 130 to move off track and/or contact a magnetic disk 108. As shown in FIG. 1A, data storage device 100 utilizes voice coil drive actuator 112 to move HGAs 120 relative to magnetic recording disks 108; however, it is understood that other means of moving HGAs 120, such as a voice coil motor (VCM), are contemplated.

In heat-assisted magnetic recording (HAMR) HDD, a magnetic recording head 130 may include a light source such as a laser, a waveguide, and a near-field transducer (NFT) to heat and lower the coercivity of magnetic grains in a spot of focus on a magnetic recording disk 108.

Figure 2:
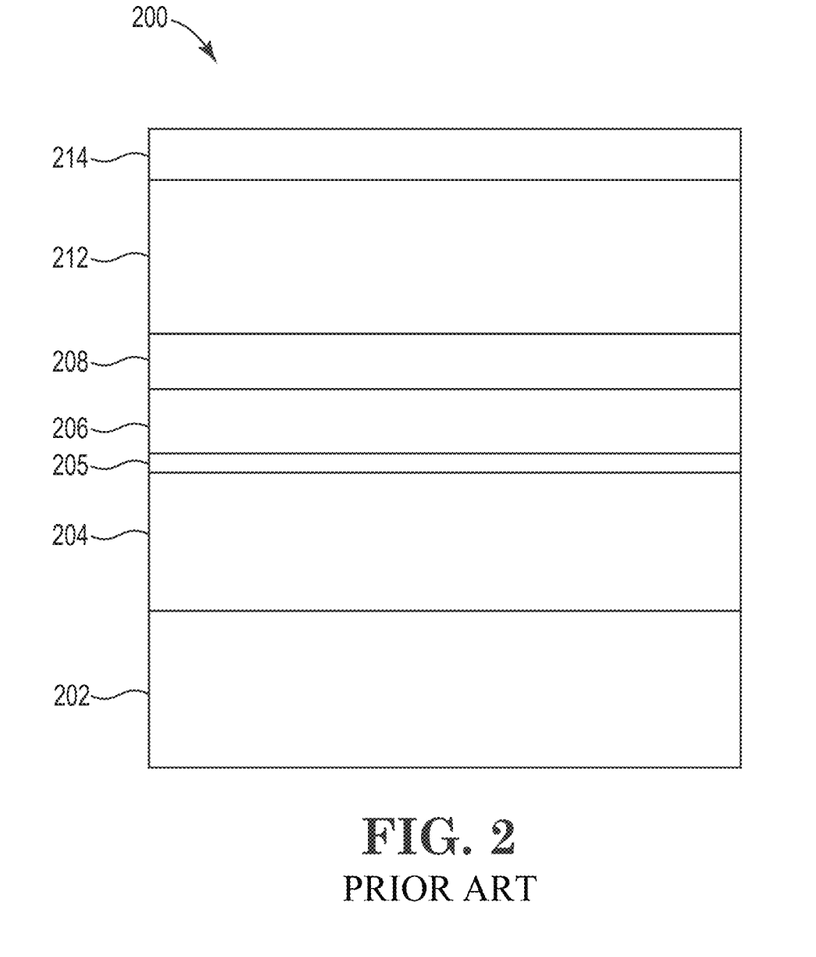
FIG. 2 is an example cross-section of a prior-art magnetic stack.

FIG. 2 illustrates an example of a prior art magnetic stack 200 that may represent an example of a magnetic recording disk 108 used in a heat assisted magnetic recording (HAMR) hard disk drive (HDD). As shown in FIG. 2, magnetic stack 200 includes substrate 202, soft magnetic underlayer 204, seed layer 205, heatsink layer 206, interlayer 208, magnetic recording structure 212, and overcoat layer 214.

In some embodiments, substrate 202 is disc-shaped and may include a non-magnetic metal, alloy or non-metal. For example, substrate 202 may include aluminum, an aluminum alloy, glass, ceramic, glass-ceramic, polymeric material, a laminate composite, or any other suitable non-magnetic material.

Soft magnetic underlayer (SUL) 204 is configured to function as a return path for magnetic flux produced by a magnetic write field during a write operation. In some examples, SUL 204 is disposed on a top surface of substrate 202. SUL 204 may include one or more layers of a soft magnetic material, such as CoFe, FeCoB, FeAlN, NiFe, or FeTaN, or combinations thereof. In one example, SUL 204 is approximately 10 nm to approximately 300 nm thick. SUL 204 may include multiple layers, which may be laminated structures and/or antiferromagnetically coupled layers.

Seed layer 205 is configured to promote growth of heat sink layer 206. Seed layer 205 is disposed on top of SUL 204. Seed layer 205 may include one or more layers of AlCr, CrRu, AlCrRu, ZnO, ZrN or combinations thereof. Typical seed layer thicknesses range from about 10 nm to about 30 nm. Seed layer 205 can be deposited with known physical or chemical deposition techniques such as radio frequency (RF) sputtering, direct current (DC) sputtering, reactive magnetron sputtering, chemical vapor deposition (CVD), pulsed laser deposition, molecular beam epitaxy, and atomic layer deposition (ALD).

Heatsink layer 206 is configured to dissipate heat from one or more layers of magnetic stack 200. As illustrated in FIG. 2, heatsink layer 206 is disposed on top of seed layer 205. Heat-sink layers according to the present disclosure are described below with respect to FIG. 3-8.

Magnetic stack 200 also includes an interlayer 208 which is disposed on a top surface of heatsink layer 206. Interlayer 208 may provide one or more functions for magnetic stack 200. Interlayer 208 separates the magnetic recording structure 212 from the layers beneath it. In some examples, interlayer 208 controls the growth orientation of magnetic recording structure 212. Interlayers according to the present disclosure are described below with respect to FIG. 3-8.

Magnetic recording structure 212 is configured to store data. Magnetic recording structure 212 is disposed on a top surface of interlayer 208. Magnetic recording structure 212 may include a single layer or multiple layers. Alternatively, magnetic recording structure 212 may be a patterned recording layer such as bit-patterned media.

Magnetic recording structure 212 may be a granular two-phase layer. In one such example, the first phase of magnetic recording structure 212 includes a plurality of magnetic grains and the second phase includes non-magnetic segregant disposed between the grain boundaries of the magnetic grains. The non-magnetic segregant may include one or more of C, $ZrO_x$, $TiO_x$, $SiO_x$, $Al_2O_3$, $Ta_2O_5$, $Si_3N_4$, BN, AlN, GaN, AlGaN, TiN, ZrN or another alternative oxide, nitride, boride or carbide material. Suitable materials for the magnetic grains include, for example, FePt, FeCoPt, FeXPt alloy, FeXPd alloy, CoPt, CoXPt where X is a dopant. In some examples, magnetic recording structure 212 may comprise a L10 phase FePt, CoPt or FeNiPt recording layer. The thickness of magnetic recording structure 212 may range from about 10 nm to about 15 nm, or beyond.

Overcoat layer 214 is configured to protect magnetic recording structure 212 from corrosion and mechanical damage during drive operation. As illustrated in FIG. 2, overcoat layer 2114 is disposed on a top surface of magnetic recording structure 212. Overcoat layer 214 may be thermally and mechanically robust. For example, overcoat layer 214 may have a high melting point (e.g., a temperature which exceeds the Curie temperature of the magnetic recording layers), which may enable overcoat layer 214 to withstand HAMR writing conditions where temperatures may exceed at least 300° C. at the media surface during the narrow recording window. In some examples overcoat layer 214 is a carbon-based material. Examples of carbon-based materials include diamond-like carbon (DLC) or tetrahedral amorphous carbon (ta-C). Other examples of overcoat materials include silicon nitride ($Si_xN_y$) or silicon oxy-nitride and hydrogenated amorphous carbon (a-C:H). In the example of FIG. 2, overcoat layer is between about 2 nm and 3 nm in thickness. In some examples, overcoat layer may include a lubrication layer.

Cumulative failure rate (CFR) is a parameter that describes the performance of HAMR, and the ability to increase areal density capability (ADC). An NFT introduces laser energy into the magnetic recording structure of a magnetic recording disk so that the temperature of the magnetic recording structure can be increased high enough so that the coercivity (Hc) drops to the level at which the magnetic fields coming from the magnetic write pole can write information to the magnetic recording structure. However, there can be a trade-off between areal density capability (ADC), which is positively correlated to temperature gradient (TG), and laser power (Iop) applied to the laser. To achieve a higher ADC and TG, the peak temperature Tpeak in the magnetic recording structure of a magnetic stack can be increased by increasing the laser power (Iop). But, increasing the laser power can increase the thermal stress on the NFT to an undue degree, which can increase the CFR. In addition to a TG-Iop trade-off, there can be what is referred to as "heat flowback" from a heat sink in the magnetic stack into the magnetic recording structure, which can decrease the TG in the magnetic recording structure of the magnetic stack. "Heat flowback" can occur in a magnetic stack because the flow path of heat is bidirectional. Eq. 1 is an approximate mathematical expression for ADC, TG, and Tpeak.

$$ADC \propto TG = \frac{dT}{dx} \propto \frac{Tpeak - Tambient}{\Delta x} \quad (1)$$

Interlayers (IL) such as interlayer 208 can serve as both a thermal resistor and a thermal barrier. As a thermal resistor, an interlayer can slow down the heat flowing away from the magnetic recording structure 212 toward substrate 202, and thus can reduce the laser power (Iop) for heating up the magnetic recording structure 212. A cost of reducing laser power (Iop) is reduced thermal gradient (TG) and therefore reduced ADC. As a thermal barrier, an interlayer can hinder or prevent heat from flowing back into recording structure 212 from a heat-sink (HS) layer such as heat-sink layer 206.

Heat-sink layers such as heat-sink layer 206 can provide fast and efficient heat dissipation path to remove the heat away from the magnetic recording structure 212.

In general, thinner IL layers and thicker HS layers can result in a higher thermal gradient (TG) at the cost of a higher Iop and higher CFR.

According to the present disclosure, as discussed in detail below, one or more additional heat-sink layers can be included between the heat-sink layer such as heat-sink layer 206 and the magnetic recording structure. In some embodiments, as also discussed in detail below, one or more additional interlayers can be included between the heat-sink layer such as heat-sink layer 206 and the magnetic recording structure. Advantageously, including additional heat-sink layers and/or additional interlayers according to various configurations of the present disclosure can increase the thermal gradient and areal density capacity (ADC), for a given laser power output (Iop).

Figure 3:
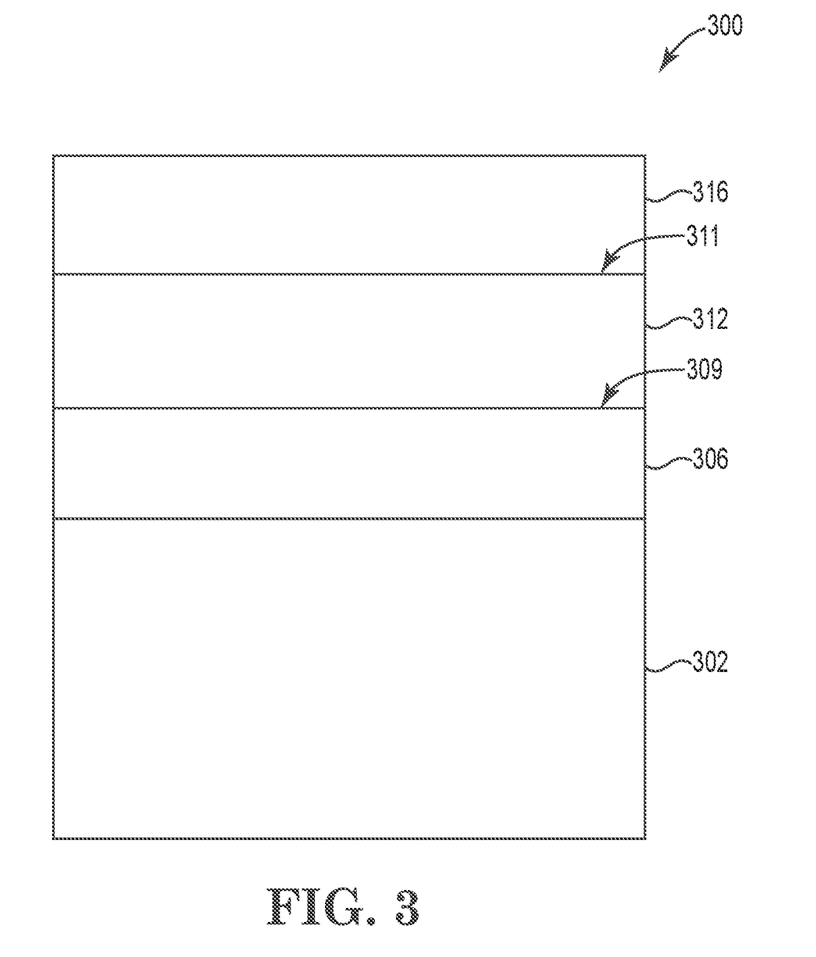
FIG. 3 is a cross-section of a magnetic stack according to the present disclosure.

According to one aspect of the present disclosure, a magnetic stack includes at least two heat-sink layers where the heat-sink layer located farthest from the magnetic recording structure has the highest thermal conductivity as compared to one or more additional heat-sink layers located closer to the magnetic recording structure. A non-limiting example of such a magnetic stack is illustrated with FIG. 3. As shown in FIG. 3, magnetic stack 300 includes heat-sink layer 302, heat-sink layer 306, interlayer 312, and magnetic recording structure 316. Magnetic recording structure 316 is similar to magnetic recording structure 212 described above. Heat-sink layer 306 is disposed between the magnetic recording structure 316 and heat-sink layer 302.

It is noted that the thermal conductivity values described herein are values measured or published at room temperature (e.g., 20° C. or 25° C.), even though a heat-sink layer and/or interlayer can be exposed to different temperatures, especially during read-write operations when a magnetic stack is being heated by an NFT. In metals and metal alloys, heat is primarily conducted by electrons, while in non-metallic solids such as dielectric, heat is conducted by phonons. It is also noted that the thermal conductivities for heat-sink layers and interlayers described herein can each represent bulk thermal conductivity of a selected material or thermal conductivity influenced by grain boundaries. For example, in some embodiments, a thin layer such as 1 nanometer of MgO may be used and an interlayer. Such a thin layer can be textured meaning it is granular, well oriented, with one of the cubic crystallographic axes oriented perpendicular to the surface of the layer while the in-plane crystallographic directions vary from grain to grain. The boundaries between the MgO grains act as barriers for the thermal flow, because the crystallographic lattice is broken. In such a case, the heat transport in the MgO interlayer is dominated by the lattice vibrations (phonon-dominated), which is why such a thin layer of MgO can have a lower thermal conductivity than as compared to the bulk thermal conductivity of MgO. Similarly, while thermal conduction of metals or metal alloys is dominated by the flow of electrons, the grain boundaries can act as barriers to electron transport at very thin layers such that the thermal conductivity of a heat-sink layer can be different than bulk thermal conductivity of the material.

As shown in FIG. 3, heat-sink layer 302 has a thermal conductivity that is greater than heat-sink layer 306. While not being bound by theory, it is believed that heat-sink layers that are located between heat-sink layer 302 and magnetic recording structure 316, and that have a lower thermal conductivity as compared to heat-sink layer 302 are believed to function, at least in part, as thermal resistors so that heat does not dissipate too fast to the last heat-sink layer 306 and/or reduce the tendency of heat to "flow back" from the heat sink layers such as heat-sink layer 306 to the magnetic recording structure 316.

In some embodiments, heat-sink layer 302 has a thermal conductivity of greater than 50 W/(m*K), 70 W/(m*K) or greater, 80 W/(m*K) or greater, 90 W/(m*K) or greater, 100 W/(m*K) or greater, 100 W/(m*K) or greater, 110 W/(m*K) or greater, 150 W/(m*K) or greater, or even 200 W/(m*K) or greater. In some embodiments, heat-sink layer 302 has a thermal conductivity from greater than 50 W/(m*K) to 500 W/(m*K), from greater than 50 W/(m*K) to 400 W/(m*K), from 80 W/(m*K) to 400 W/(m*K), or even from 110 W/(m*K) to 200 W/(m*K).

Heat-sink layer 302 can include a variety of metals or metal alloys having a relatively high thermal conductivity. Non-limiting examples of such metals include one or more metals chosen from molybdenum (Mo), tungsten (W), chromium (Cr), copper (Cu), silver (Ag), gold (Au), and combinations thereof.

Heat-sink layer 302 can have a variety of thicknesses. In some embodiments, heat-sink layer 302 has a thickness from 10 to 120 nanometers, from 10 to 100 nanometers, or even from 20 to 60 nanometers.

A magnetic stack according to the present disclosure can include one or more additional heat-sink layers disposed between the "bottom" heat-sink layer such as heat-sink layer 302 and the magnetic recording structure. Magnetic stack 300 includes heat-sink layer 306 that is disposed between the magnetic recording structure 316 and heat-sink layer 302. As shown, heat-sink layer 306 is in contact with each of heat-sink layer 302 and interlayer 312.

Heat-sink layer 306 has the thermal conductivity less than the thermal conductivity of heat-sink layer 302. For example, heat-sink layer 306 can have a thermal conductivity of 50 W/(m*K) or less, 40 W/(m*K) or less, 30 W/(m*K) or less, 20 W/(m*K) or less, or even 15 W/(m*K) or less. In some embodiments, heat-sink layer 306 has a thermal conductivity from greater than 3 W/(m*K) to 50 W/(m*K), from 3 W/(m*K) to 20 W/(m*K), or even from 3 W/(m*K) to 15 W/(m*K).

Heat-sink layer 306 can include a variety of materials having a thermal conductivity that is less than the thermal conductivity of heat-sink layer 302. In some embodiments, heat-sink layer 306 includes materials having metallic-like optical properties. In some embodiments, heat-sink layer 306 includes an alloy of a metal in heat-sink layer 302, which can help match the lattice structures while providing heat-sink layer 306 with a lower thermal conductivity than heat-sink layer 302. In some embodiments, heat-sink layer 306 includes an alloy of one or more metals chosen from molybdenum (Mo), tungsten (W), chromium (Cr), copper (Cu), silver (Ag), gold (Au), and combinations thereof, with one or more metals chosen from iron (Fe), chromium (Cr), tantalum (Ta), titanium (Ti), and combinations thereof. In some embodiments, heat-sink layer 306 includes tantalum nitride (TaN), tantalum oxynitride (TaON), titanium nitride (TiN), titanium oxynitride (TiON), Mo—Cr—Ta alloys, Mo—Fe(x) (with x=0.05-0.5), MoFe—X, Mo—Fe—X—Y, MoFe—XYZ, and combinations thereof.

Heat-sink layer 306 can have a variety of thicknesses. In some embodiments, heat-sink layer 306 has a thickness from 2 to 30 nanometers, from 2 to 20 nanometers, or even from 5 to 20 nanometers.

In some embodiments, the lattice structure (e.g., face-centered-cubic (FCC) or body-centered-cubic (BCC), among two or more of heat-sink layers 302 and 306, and interlayer 312 can be the same to facilitate epitaxial growth. In some embodiments, a lattice mismatch among two or more of heat-sink layers 302 and 306, and interlayer 312 is 10% or less, or even 5% or less.

Magnetic stack 300 includes interlayer 312 disposed between the magnetic recording structure 316 and heat-sink layer 306. In some embodiments, as shown in FIG. 3, interlayer 312 is positioned directly between magnetic recording structure 316 and heat-sink layer 306 so that interlayer 312 contacts heat-sink layer 306 at interface 309 and interlayer 312 contacts magnetic recording structure 316 at interface 311. At an interface between a metal or metal alloy, and a dielectric (e.g., an oxide), the thermal conduction mechanisms change from phonon-dominated (crystal lattice vibrations) in dielectrics, to electron-dominated in metals or metal alloys, and vice-versa. This change or transition in the thermal conduction mechanisms manifests as an increased resistance to the thermal flow from one material type to another, and is referred to as an interface thermal resistance. In FIG. 3, the interface 309 that has an interface thermal resistance. In some embodiments, interface 309 can have a thermal conductivity from 0.1 to 1.5 W/(m*K), or even from 0.1 to 1 W/(m*K).

As shown in FIG. 3, even though heat-sink layer 306 can have a thermal resistor quality due to its lower thermal conductivity as compared to heat-sink layer 302, interlayer 312 has a thermal conductivity that is less than the thermal conductivity of both the heat-sink layer 302 and the heat-sink layer 306.

In some embodiments, interlayer 312 has a thermal conductivity of less than 4 W/(m*K), 2.5 W/(m*K) or less, or even 2 W/(m*K) or less. In some embodiments interlayer 312 has a thermal conductivity from 0.5 W/(m*K) to less than 3 W/(m*K), or even from 1 W/(m*K) to 2.5 W/(m*K).

Interlayer 312 can include a variety of materials having a relatively low thermal conductivity. In some embodiments, interlayer 312 includes materials having dielectric-like optical properties. Non-limiting examples of such materials include magnesium oxide $(MgO)_x(TiO)_y$, where x+y=1, and x is from 0.3-1, manganese titanium oxide (MTO), and combinations thereof.

Interlayer 312 can have a variety of thicknesses. In some embodiments, interlayer 312 has a thickness from 0.5 to 20 nanometers, from 1 to 16 nanometers, or even from 1 to 10 nanometers.

If desired, one or more heat-sink layers in addition to heat-sink layer 306 could be disposed between the magnetic recording structure 316 and heat-sink layer 302, where the one or more additional heat-sink layers each have a thermal conductivity less than heat-sink layer 302. Also, if desired, one or more interlayers in addition to interlayer 312 could be disposed between the magnetic recording structure 316 and heat-sink layer 306, where the one or more additional interlayers each have a thermal conductivity less than both of heat-sink layer 302 and heat-sink layer 306. Also, the order among the additional heat-sink layers and interlayers can be varied while keeping the heat-sink layer 302 the farthest heat-sink layer away from magnetic recording structure 316 and the interlayers below the magnetic recording structure 316.

FIGS. 4, 5, 7, and 8 represent "prophetic" simulations using COMSOL Multiphysics® software. The peak temperatures of the magnetic stacks are fixed values for the simulations. The laser power (Iop) difference would be expected to be larger in practice since the simulations assume a maximum ADC.

Figure 4:
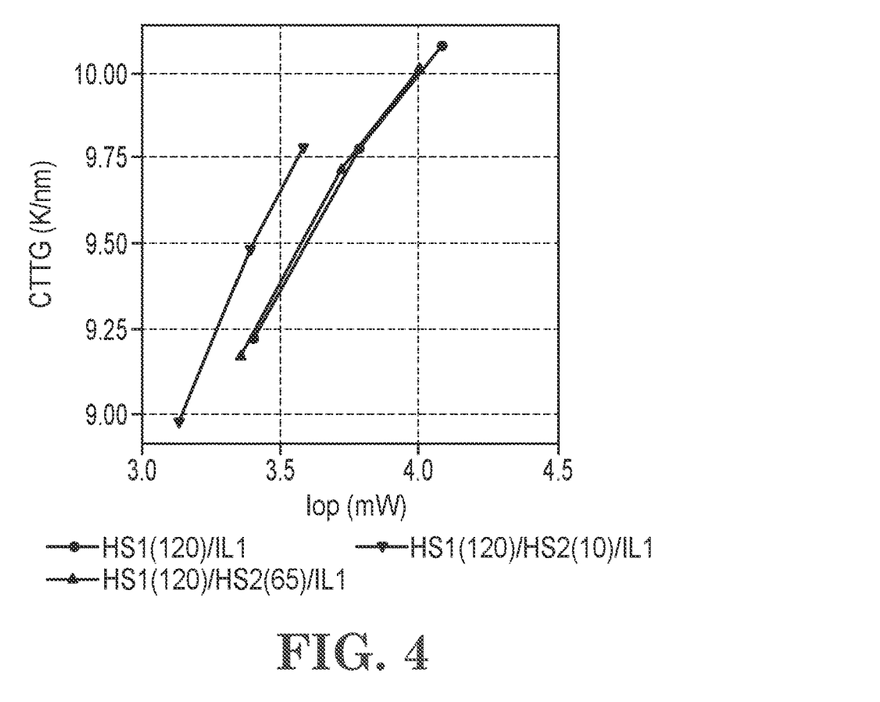
FIG. 4 is a graph that represents simulations of laser power (Iop) versus thermal gradient (CTTG) for different configurations of magnetic stacks.

FIG. 4 represents simulations of laser power (Iop) versus thermal gradient (CTTG) for different configurations of magnetic stacks. CCTG stands for cross-track thermal gradient. Thermal gradient (TG) encompasses both CCTG and DTTG (down-track thermal gradient) so all three are correlated. The numbers in the parentheses represents the thermal conductivity. HS1 represents a heat-sink layer made out of molybdenum (Mo) having a thermal conductivity of 120 W/(m*K), and that has a thickness that is fixed at 40 nm. HS2 represents a heat-sink layer that has a thickness fixed at 10 nm, and has a thermal conductivity that is either 10 W/(m*K) or 65 W/(m*K). HS2 could include tantalum nitride (TaN), tantalum oxynitride (TaON), titanium nitride (TiN), titanium oxynitride (TiON), Mo—Cr—Ta alloys, Mo—Fe (x) (with x=0.05-0.5), MoFe—X, Mo—Fe—X—Y, MoFe—XYZ, and combinations thereof. IL1 represents an interlayer that includes manganese titanium oxide (MTO), and has a thickness that decreases from 10 nm (lower left) to 4 nm (upper right).

All of the layers of the magnetic stacks in FIG. 4 (HS1, HS2, IL1) are shown in the order that they would be in a magnetic stack with the interlayer (IL1) being closest to the magnetic recording structure. Also, the adjacent layers in the order shown would be in direct contact with each other. The magnetic stack that includes HS2 having a thermal conductivity of 10 W/(m*K) represents an example heat-sink layer 306 in FIG. 3, which represents a magnetic stack according to the present disclosure.

For all magnetic stacks in FIG. 4, the CTTG increases for decreasing interlayer thickness.

Although HS2 having a thermal conductivity of 65 W/K-m is less than the thermal conductivity of HS1 (120 W/K-m), the effect is almost unchanged compared to the magnetic stack that includes only one heat-sink layer HS1 (no HS2 present).

But, including heat-sink layer HS2 with a thermal conductivity of 10 W/K-m shows a shift that results in a higher thermal gradient (CTTG) for a given laser power (Iop), which is a better Iop-TG trade-off as compared to the other two simulations. Also, the CTTG-Iop slope becomes steeper.

While not being bound by theory, it is believed that the additional high thermal resistance interface between IL1 and HS2 enables a comparable ADC at lower laser power. It is also believed that the low thermal conductivity of 10 W/K-m for HS2 serves as a thermal resistor to prevent the heat from dissipating too fast from a magnetic recording structure into the bottom HS1 and/or hinders or prevents flow back of heat from the HS2 layer into a magnetic recording structure.

Figure 5:
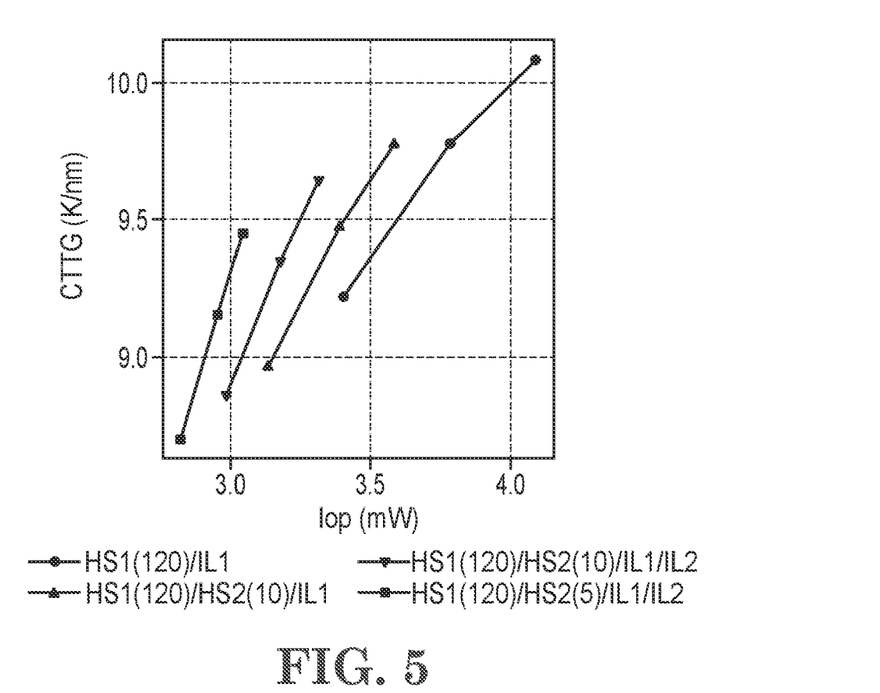
FIG. 5 is another graph that represents simulations of laser power (Iop) versus thermal gradient (CTTG) for different configurations of magnetic stacks.

FIG. 5 represents a simulation for different configurations of magnetic stacks. Like FIG. 4, the numbers in the parentheses represents the thermal conductivity. Also, like FIG. 4, HS1 represents a heat-sink layer made out of molybdenum (Mo) having a thermal conductivity of 120 W/(m*K), and that has a thickness that is fixed at 40 nm. HS2 represents a heat-sink layer that has a thickness fixed at 10 nm, and has a thermal conductivity that is either 10 W/(m*K) or 5 W/(m*K). HS2 could include tantalum nitride (TaN), tantalum oxynitride (TaON), titanium nitride (TiN), titanium oxynitride (TiON), Mo—Cr—Ta alloys, Mo—Fe(x) (with x=0.05-0.5), MoFe—X, Mo—Fe—X—Y, MoFe—XYZ, and combinations thereof.

For the magnetic stacks that have only one interlayer (IL1), IL1 represents an interlayer that includes manganese titanium oxide (MTO), and has a thickness that decreases from 10 nm (lower left) to 4 nm (upper right).

For the magnetic stacks that have two interlayers (IL1 and IL2), IL1 represents an interlayer that includes magnesium oxide (MgO), and has a thickness that is fixed at 1 nm, while IL2 represents an interlayer that includes manganese titanium oxide (MTO), and has a thickness that decreases from 9 nm (lower left) to 3 nm (upper right).

According to another aspect of the present disclosure, IL2 has a lower thermal conductivity as compared to IL1. IL2 also has a lower interface thermal resistance as compared to IL1.

As can be seen, the total interlayer thickness of IL1 and IL2 for the dual interlayer scenario equals the total interlayer thickness of IL1 for the single interlayer scenario.

All of the layers of the magnetic stacks in FIG. 5 (HS1, HS2, IL1, IL2) are shown in the order that they would be in a magnetic stack with the interlayer (IL1 or IL2) being closest to the magnetic recording structure. Also, the adjacent layers in the order shown would be in direct contact with each other. The magnetic stack that includes HS2 having a thermal conductivity of 10 W/(m*K) and a single interlayer IL1 represents an example heat-sink layer 306 in FIG. 3, which represents a magnetic stack according to the present disclosure. The magnetic stacks that includes HS2 having a thermal conductivity of 10 W/(m*K) or 5 W/(m*K) and a dual interlayer (IL1 and IL2) scenario represent alternative embodiments of the magnetic stack shown in FIG. 3, which are also magnetic stacks according to the present disclosure.

For all magnetic stacks in FIG. 5, the CTTG increases for decreasing interlayer thickness.

FIG. 5 shows that the thermal gradient (CTTG) versus laser power (Iop) curve can be shifted even further left as compared to FIG. 4 by inserting an additional interlayer IL1 between HS2 and IL2, and/or by decreasing the thermal conductivity of HS2 even further from 10 W/K-m to 5 W/K-m. Also, the CTTG-Iop slope becomes steeper.

Figure 6:
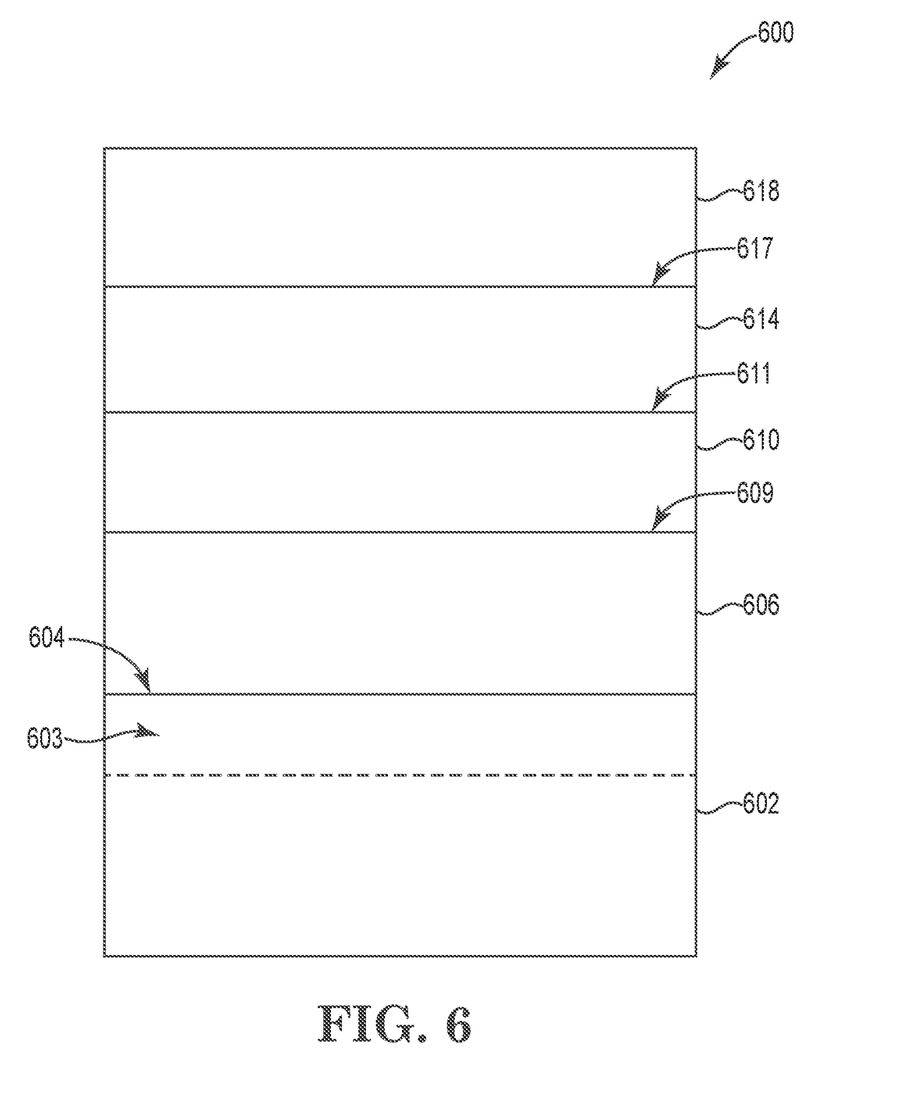
FIG. 6 is a cross-section of another magnetic stack according to the present disclosure.

According to one aspect of the present disclosure, a magnetic stack can include at least two heat-sink layers and at least two interlayers where at least these heat-sink layers and interlayers are positioned relative to each other in an alternating manner. The heat-sink layer located farthest from the magnetic recording structure has the highest thermal conductivity as compared to one or more additional heat-sink layers located closer to the magnetic recording structure. In some embodiments, the interlayer located farthest from the magnetic recording structure also has the highest thermal conductivity as compared to one or more additional interlayers located closer to the magnetic recording structure. A non-limiting example of such a magnetic stack is illustrated with FIG. 6. As shown in FIG. 6, magnetic stack 600 includes heat-sink layer 602, interlayer 606, heat-sink layer 610, interlayer 614, and magnetic recording structure 618. Heat-sink layer 602 and heat-sink layer 610 are substantially the same as heat-sink layer 302 and heat-sink layer 306 discussed above with respect to thermal conductivity, composition, and thickness, so that discussion is not repeated here. Optionally, as shown by the dotted lines in FIG. 6, magnetic stack 600 can include another heat-sink layer 603 disposed between, and in contact with, heat sink layer 602 and interlayer 606. Heat sink layer 603 is substantially the same as heat sink layer 302 discussed above with respect to location in the magnetic stack, thermal conductivity, composition, and thickness, so that discussion is not repeated here. The alternating configuration among heat-sink layers and interlayers as illustrated with heat-sink layer 602, interlayer 606, heat-sink layer 610, and interlayer 614, can be repeated as many times as desired.

Also, magnetic recording structure 618 is substantially the same as magnetic recording structure 316 described above so that discussion is not repeated here.

With respect to the interlayers in magnetic stack 600, interlayer 606 is disposed between the heat-sink layer 602 and the heat-sink layer 610. Interlayer 614 is disposed between the magnetic recording structure 618 and the heat-sink layer 610. As shown in FIG. 6, interlayer 614 is positioned directly between magnetic recording structure 618 and heat-sink layer 610 so that interlayer 614 contacts heat-sink layer 610 at interface 611 and interlayer 614 contacts magnetic recording structure 618 at interface 617. As shown in FIG. 6, interlayer 606 is positioned directly between heat-sink layer 610 and heat-sink layer 602 (or heat-sink layer 603) so that interlayer 606 contacts heat-sink layer 610 at interface 609 and interlayer 606 contacts heat-sink layer 602 (or heat-sink layer 603) at interface 604. As can be seen by comparing magnetic stack 300 to magnetic stack 600, magnetic stack 600 creates an additional interlayer interface for heat-sink layer 306 by inserting heat-sink layer 610 directly between interlayers 606 and 614, thereby creating interfaces 609 and 611, respectively. While not being bound by theory, it is believed that the additional interface at, e.g., 611 between heat-sink layer 610 and interlayer 614 can create additional interface thermal resistance to further reduce the laser power while not sacrificing thermal gradient (TG) to an undue degree.

One or more interlayers (e.g., interlayer 606) disposed between the heat-sink layer 602 and the heat-sink layer 610 each have a thermal conductivity that is less than the thermal conductivity of heat-sink layer 602 and heat-sink layer 610. In some embodiments, interlayer 606 has a thermal conductivity of less than 4 W/(m*K), 2.5 W/(m*K) or less, or even 2 W/(m*K) or less. In some embodiments interlayer 606 has a thermal conductivity from 0.5 W/(m*K) to less than 3 W/(m*K), or even from 1 W/(m*K) to 2.5 W/(m*K).

Interlayer 606 can include a variety of materials having a relatively low thermal conductivity. In some embodiments, interlayer 606 includes materials having dielectric-like optical properties. Non-limiting examples of such materials include magnesium oxide $(MgO)_x(TiO)_y$, where x+y=1, and x is from 0.3-1, manganese titanium oxide (MTO), and combinations thereof.

Interlayer 606 can have a variety of thicknesses. In some embodiments, interlayer 606 has a thickness from 0.1 to 12 nanometers, from 0.1 to 10 nanometers, or even from 0.1 to 5 nanometers.

One or more interlayers (e.g., interlayer 614) disposed between the heat-sink layer 610 and magnetic recording structure 618 each have a thermal conductivity that is less than the thermal conductivity of heat-sink layer 602 and heat-sink layer 610. In some embodiments, or more interlayers (e.g., interlayer 614) disposed between the heat-sink layer 610 and magnetic recording structure 618 each have a thermal conductivity less than the one or more interlayers (e.g., interlayer 606) disposed between the heat-sink layer 602 and the heat-sink layer 610. In some embodiments, interlayer 614 has a thermal conductivity of less than 3.5 W/(m*K), 2.5 W/(m*K) or less, or even 2 W/(m*K) or less.

In some embodiments interlayer 606 has a thermal conductivity from 0.5 W/(m*K) to less than 2.5 W/(m*K), or even from 1 W/(m*K) to 2 W/(m*K).

Interlayer 614 can include a variety of materials having a relatively low thermal conductivity. In some embodiments, interlayer 614 includes materials having dielectric-like optical properties. Non-limiting examples of such materials include magnesium oxide $(MgO)_x(TiO)_y$, where x+y=1, and x is from 0.3-1, manganese titanium oxide (MTO), and combinations thereof.

Interlayer 614 can have a variety of thicknesses. In some embodiments, interlayer 614 has a thickness greater than the thickness of interlayer 606. In some embodiments, interlayer 614 has a thickness from 0.5 to 20 nanometers, from 3 to 16 nanometers, or even from 3 to 9 nanometers.

Figure 7:
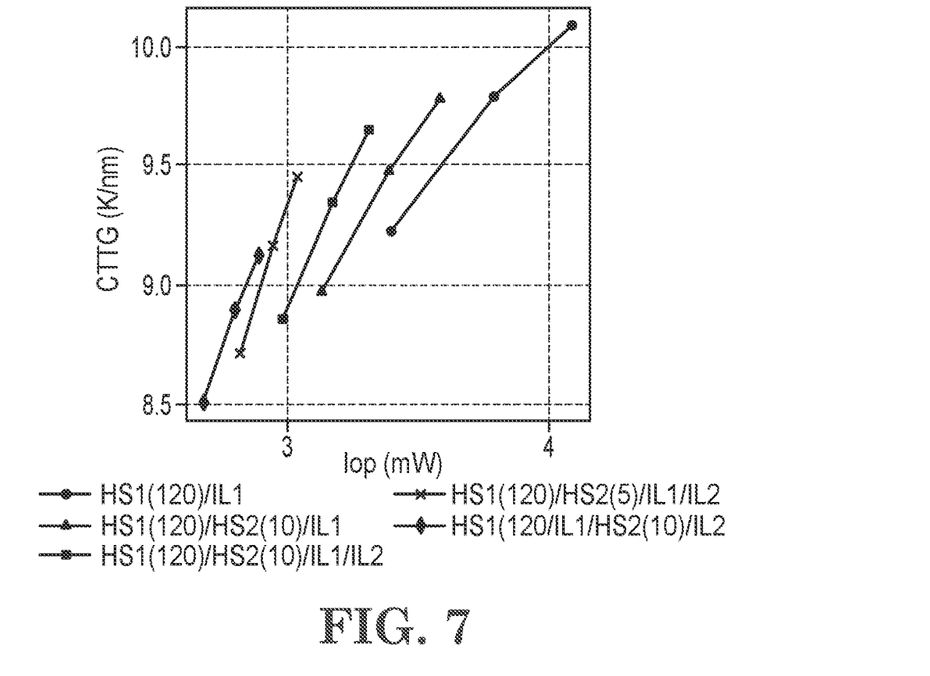
FIG. 7 is another graph that represents simulations of laser power (Iop) versus thermal gradient (CTTG) for different configurations of magnetic stacks.

FIG. 7 represents a simulation for different configurations of magnetic stacks. Like FIG. 4, the numbers in the parentheses represents the thermal conductivity. Also, like FIG. 4, HS1 represents a heat-sink layer made out of molybdenum (Mo) having a thermal conductivity of 120 W/(m*K), and that has a thickness that is fixed at 40 nm. HS2 represents a heat-sink layer that has a thickness fixed at 10 nm, and has a thermal conductivity that is either 10 W/(m*K) or 5 W/(m*K). HS2 could include tantalum nitride (TaN), tantalum oxynitride (TaON), titanium nitride (TiN), titanium oxynitride (TiON), Mo—Cr—Ta alloys, Mo—Fe(x) (with x=0.05-0.5), MoFe—X, Mo—Fe—X—Y, MoFe—XYZ, and combinations thereof.

For the magnetic stacks that have only one interlayer (IL1), IL1 represents an interlayer that includes manganese titanium oxide (MTO), and has a thickness that decreases from 10 nm (lower left) to 4 nm (upper right).

For the magnetic stacks that have two interlayers (IL1 and IL2), IL1 represents an interlayer that includes magnesium oxide (MgO), and has a thickness that is fixed at 1 nm, while IL2 represents an interlayer that includes manganese titanium oxide (MTO), and has a thickness that decreases from 9 nm (lower left) to 3 nm (upper right). IL2 has a lower thermal conductivity as compared to IL1. IL2 also has a lower interface thermal resistance as compared to IL1.

As can be seen, the total interlayer thickness of IL1 and IL2 for the dual interlayer scenario equals the total interlayer thickness of IL1 for the single interlayer scenario.

All of the layers of the magnetic stacks in FIG. 7 (HS1, HS2, IL1, IL2) are shown in the order that they would be in a magnetic stack with the interlayer (IL1 or IL2) being closest to the magnetic recording structure. Also, the adjacent layers in the order shown would be in direct contact with each other. For all magnetic stacks in FIG. 5, the TG increases for decreasing interlayer thickness.

The magnetic stack having the layers ordered as HS1 (120)/IL1/HS2(10)/IL2 represents an example of magnetic stack 600 in FIG. 6, which shows how magnetic stack configurations can alternate heat-sink layers and interlayers to provide a desirable thermal gradient using less laser power.

FIG. 7 shows that the thermal gradient (CTTG) versus laser power (Iop) curve can be shifted even further left as compared to FIG. 4 by inserting HS2 between IL2 and IL1. While not being bound by theory, it is believed that the additional interface between IL2 and HS2 can create an additional thermal resistance to further reduce the laser power. Also, the CTTG-Iop slope becomes steeper.

Figure 8:
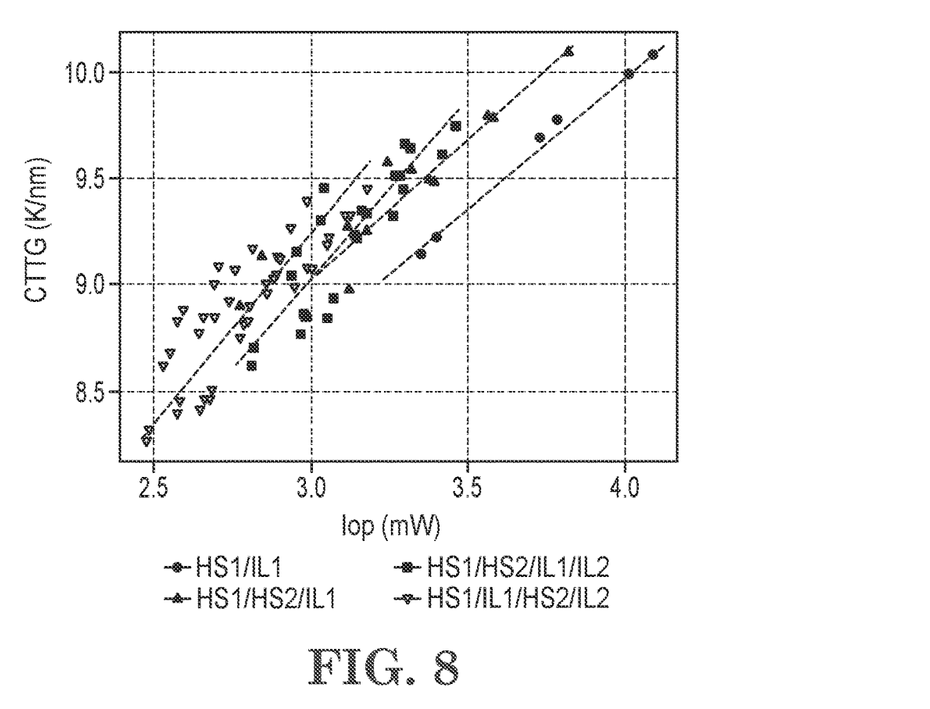
FIG. 8 is another graph that represents simulations of laser power (Iop) versus thermal gradient (CTTG) for different configurations of magnetic stacks.

FIG. 8 represents a simulation for a different architecture incorporating various HS1/HS2 thicknesses/thermal conductivities. FIG. 8 illustrates the fundamental differences in Iop-CTTG slopes for various architectures, even with changes to the thermal conductivity (TC) or thickness of HS1 or HS2. HS1 represents a heat-sink layer made out of molybdenum (Mo) having a thermal conductivity of 120 W/(m*K), and that has a thickness that is 30 nm or 40 nm. HS2 represents a heat-sink layer that has a thickness of 5 nm or 10 nm, and has a thermal conductivity that is 5 or 10 W/(m*K). HS2 could include tantalum nitride (TaN), tantalum oxynitride (TaON), titanium nitride (TiN), titanium oxynitride (TiON), Mo—Cr—Ta alloys, Mo—Fe(x) (with x=0.05-0.5), MoFe—X, Mo—Fe—X—Y, MoFe—XYZ, and combinations thereof.

For the magnetic stacks that have only one interlayer (IL1), IL1 represents an interlayer that includes manganese titanium oxide (MTO), and has a thickness that increases from 4 nm (lower left) to 10 nm (upper right).

For the magnetic stacks that have two interlayers (IL1 and IL2), IL1 represents an interlayer that includes magnesium oxide (MgO), and has a thickness that is fixed at 1 nm, while IL2 represents an interlayer that includes manganese titanium oxide (MTO), and has a thickness that increases from 3 nm (lower left) to 9 nm (upper right). IL2 has a lower thermal conductivity as compared to IL1. IL2 also has a lower interface thermal resistance as compared to IL1.

As can be seen by comparing similar magnetic stacks architectures among FIGS. 7 and 8, using different thermal conductivity in a layer can impact the slope of the curve.

Figure 9:
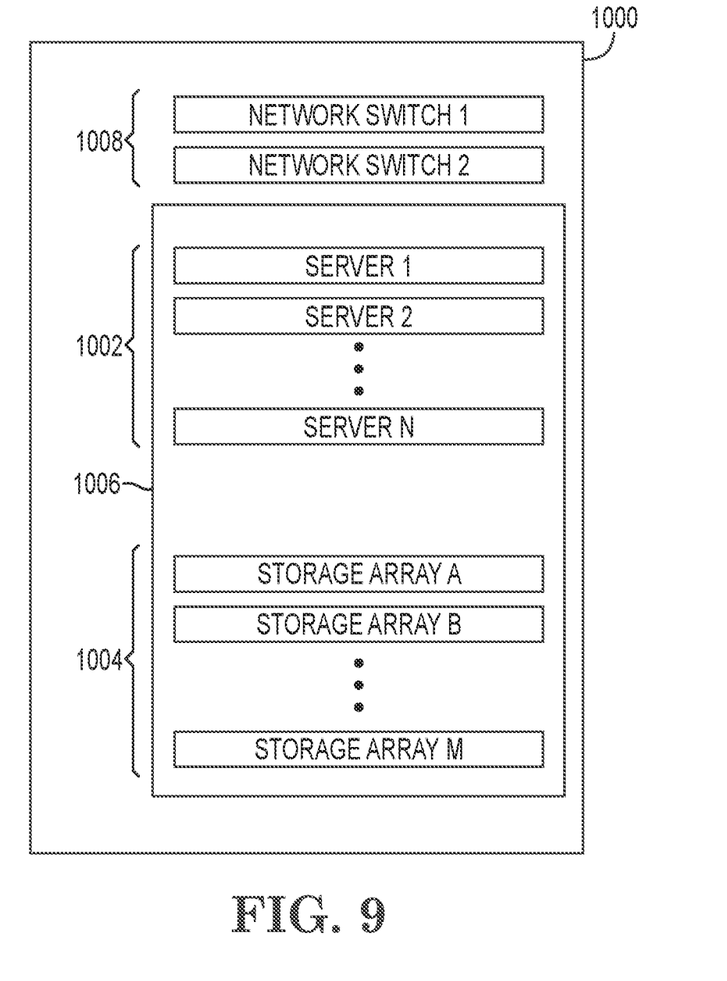
FIG. 9 is a block diagram of a data center system including a plurality of data storage devices according to the present disclosure.

FIG. 9 illustrates a non-limiting example of a computing system 1000 that includes a plurality of data storage devices (e.g., data storage device 100) that include one or more magnetic stacks according to the present disclosure. In FIG. 9, a diagram shows a computing system 1000 that can have a computing enclosure used in network storage services. As shown, the computing enclosure includes a plurality of servers 1002 coupled to a plurality of drive arrays 1004 via a rack-level network fabric 1006. Each server 1002 can include at least one CPU coupled to random access memory (RAM) and an input/output (IO) subsystem. Each server 1002 may have one or more dedicated power supplies (not shown) or the enclosure may provide power through a power bus (not shown). Each server 1002 may also have an IO interface for connecting to the rack-level network fabric 1006.

The drive arrays 1004 may each include a separate sub-enclosure with IO busses, power supplies, storage controllers, etc. The drive arrays 1004 include a plurality of individual data storage devices (e.g., HDD) densely packed into the sub-enclosure. An example of a data center that includes a computing system have a plurality of data storage devices is also described in U.S. Pat. No. 11,567,834 (Bent et al.).

What is claimed is:

1. A magnetic stack, comprising:
   a magnetic recording structure;
   a first heat-sink layer having a thermal conductivity;
   a second heat-sink layer disposed between the magnetic recording structure and the first heat-sink layer, wherein the second heat-sink layer has a thermal conductivity that is 50 W/(m*K) or less, and that is less than the thermal conductivity of the first heat-sink layer;
   at least one interlayer disposed between the first heat-sink layer and the second heat-sink layer, wherein the at least one interlayer has a thermal conductivity that is less than the thermal conductivity of the second heat-sink layer; and
   at least one interlayer disposed between the magnetic recording structure and the second heat-sink layer, wherein the at least one interlayer has a thermal conductivity that is less than the thermal conductivity of the second heat-sink layer.

2. The magnetic stack of claim 1, wherein the thermal conductivity of the first heat-sink layer is 80 W/(m*K) or greater.

3. The magnetic stack of claim 1, wherein the first heat-sink layer comprises one or more metals, and wherein the second heat-sink layer comprises one or more alloys of the one or more metals.

4. The magnetic stack of claim 1, wherein the first heat-sink layer comprises one or more first metals chosen from molybdenum (Mo), tungsten (W), chromium (Cr), copper (Cu), silver (Ag), gold (Au), and combinations thereof, and wherein the second heat-sink layer comprises at least one of the one or more first metals alloyed with one or more second metals chosen from iron (Fe), chromium (Cr), tantalum (Ta), titanium (Ti), and combinations thereof.

5. The magnetic stack of claim 1, wherein the first heat-sink layer comprises one or more metals chosen from molybdenum (Mo), tungsten (W), chromium (Cr), copper (Cu), silver (Ag), gold (Au), and combinations thereof, and wherein the second heat-sink layer comprises tantalum nitride (TaN), tantalum oxynitride (TaON), titanium nitride (TiN), titanium oxynitride (TiON), and combinations thereof.

6. The magnetic stack of claim 1, wherein the first heat-sink layer has a thickness from 10 to 120 nanometers, and wherein the second heat-sink layer has a thickness from 2 to 30 nanometers.

7. The magnetic stack of claim 1, wherein the first heat-sink layer has a thickness from 10 to 120 nanometers, the second heat-sink layer has a thickness from 2 to 30 nanometers, and each interlayer has a thickness from 1 to 16 nanometers.

8. The magnetic stack of claim 1, wherein each interlayer has a thermal conductivity that is 2.5 W/(m*K) or less.

9. The magnetic stack of claim 1, wherein each interlayer comprises material chosen from $(MgO)_x(TiO)_y$ where $x+y=1$, manganese titanium oxide (MTO), and combinations thereof.

10. A magnetic recording disk configured to be disposed in a hard disk drive, wherein the magnetic recording disk comprises the magnetic stack of claim 1.

11. A data storage device comprising:
    a housing having an interior gas space;
    one or more electronic components disposed within the housing; and
    at least one magnetic recording disk of claim 10 disposed within the housing.

12. The data storage device of claim 11, wherein the data storage device is a heat-assisted magnetic recording hard disk drive, wherein the heat-assisted magnetic recording hard disk drive comprises a heat-assisted magnetic recording head adapted to receive electrical power for a laser that is adapted to apply the laser to the magnetic recording structure, and wherein when the laser is applied to the magnetic recording disk, the magnetic recording disk has a thermal gradient that decreases from the magnetic recording structure to the first heat-sink layer, wherein the thermal gradient is greater than a thermal gradient for an identical magnetic stack having a second heat-sink layer with a thermal conductivity that is greater than 50 W/(m*K).

13. A computing system comprising a plurality of data storage devices according to claim 11.

14. The magnetic stack of claim 1, wherein the thermal conductivity of the at least one interlayer disposed between the magnetic recording structure and the second heat-sink layer is less than the thermal conductivity of the at least one interlayer disposed between the first heat-sink layer and the second heat-sink layer.

15. The magnetic stack of claim 1, wherein the at least one interlayer disposed between the first heat-sink layer and the second heat-sink layer comprises material chosen from $(MgO)x(TiO)y$, manganese titanium oxide (MTO), and combinations thereof, wherein $x+y=1$, and x is from 0.3-1.

16. The magnetic stack of claim 1, wherein the at least one interlayer disposed between the first heat-sink layer and the second heat-sink layer has a thickness from 0.1 to 12 nanometers.

17. The magnetic stack of claim 1, wherein the thermal conductivity of the at least one interlayer disposed between the magnetic recording structure and the second heat-sink layer is 4 W/(m*K) or less.

18. A magnetic stack, comprising:
a magnetic recording structure;
a first heat-sink layer having a thermal conductivity;
a second heat-sink layer disposed between the magnetic recording structure and the first heat-sink layer, wherein the second heat-sink layer has a thermal conductivity that is less than the thermal conductivity of the first heat-sink layer;
a first interlayer disposed between the magnetic recording structure and the second heat-sink layer, wherein the first interlayer has a thermal conductivity that is less than the thermal conductivity of the second heat-sink layer; and
a second interlayer disposed between the magnetic recording structure and the first interlayer, and wherein the thermal conductivity of the second interlayer is less than the thermal conductivity of the first interlayer.

* * * * *